W. Q. PFAHLER.
GEARING FOR TRACTORS.
APPLICATION FILED FEB. 12, 1919.

1,319,176.

Patented Oct. 21, 1919.
2 SHEETS—SHEET 1.

Witness

Inventor,
W. Q. Pfahler
By C. A. Snow & Co.
Attorneys.

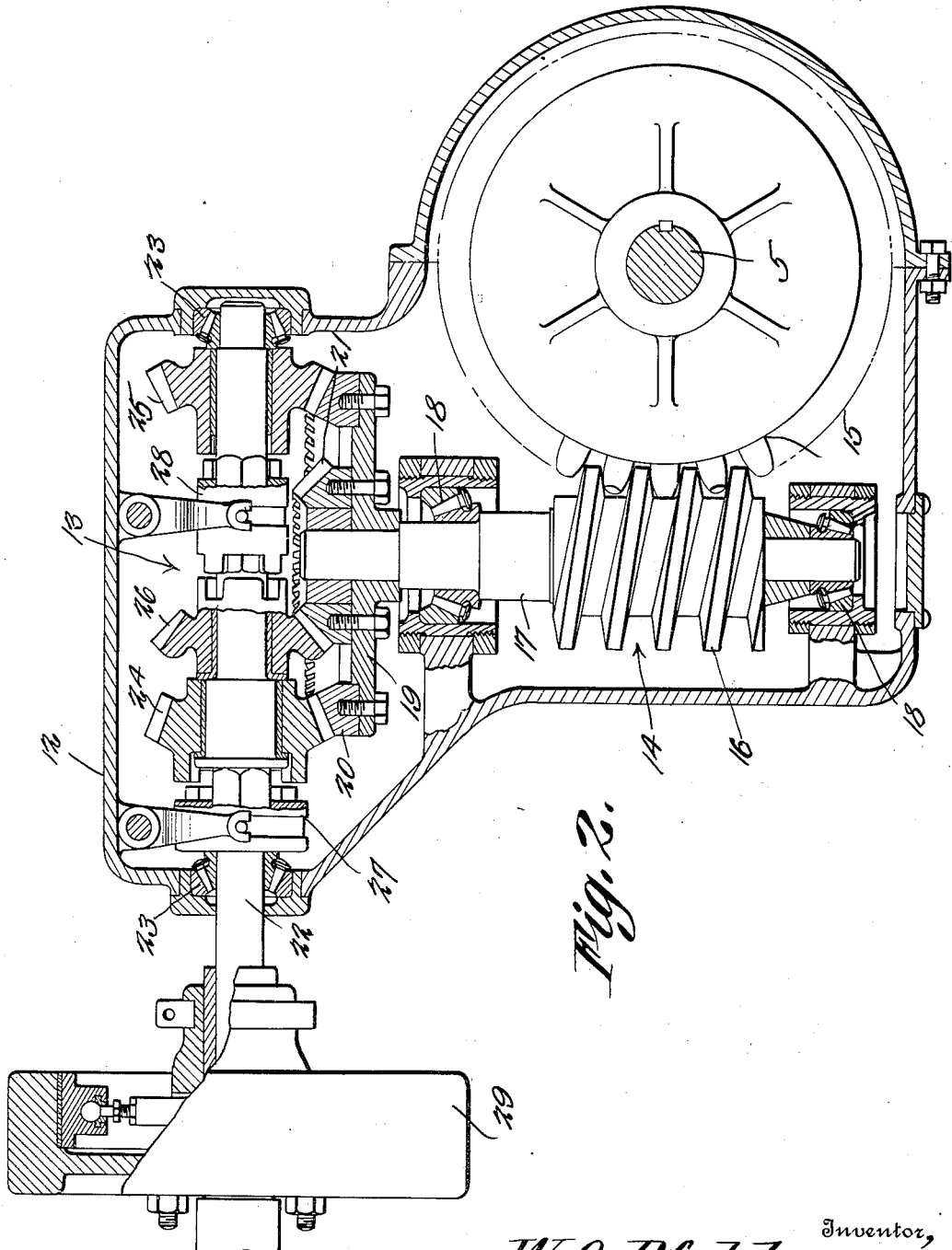

UNITED STATES PATENT OFFICE.

WILLIAM Q. PFAHLER, OF TOLEDO, OHIO.

GEARING FOR TRACTORS.

1,319,176.     Specification of Letters Patent.     Patented Oct. 21, 1919.

Application filed February 12, 1919. Serial No. 276,568.

*To all whom it may concern:*

Be it known that I, WILLIAM Q. PFAHLER, a citizen of the United States, residing at Toledo, in the county of Lucas and State of Ohio, have invented a new and useful Gearing for Tractors, of which the following is a specification.

This invention relates to improvements in tractors of the internal combustion engine type and more particularly to the transmission mechanism of such machines; and the objects of my improvements are first, to provide a compact assembly of the speed change gear and axle drive and a single housing for the same; second, to place the speed change gear, and the axle drive in such relative position that the long drive shaft, with its attendant torque, heretofore present in worm driven transmission will be eliminated; and third to provide a strong, simple, and durable transmission for the purpose intended.

With these and other objects which will appear as the description proceeds, my invention consists in the various features of construction, combinations of elements, and arrangement of parts, as will be clearly understood from the description hereinafter appearing, taken in connection with the accompanying drawings, and the novel features of which will be pointed out in the claims at the end of this specification.

In the accompanying drawings:

Fig. 2 is a view in longitudinal section of the transmission mechanism.

Figure 1:
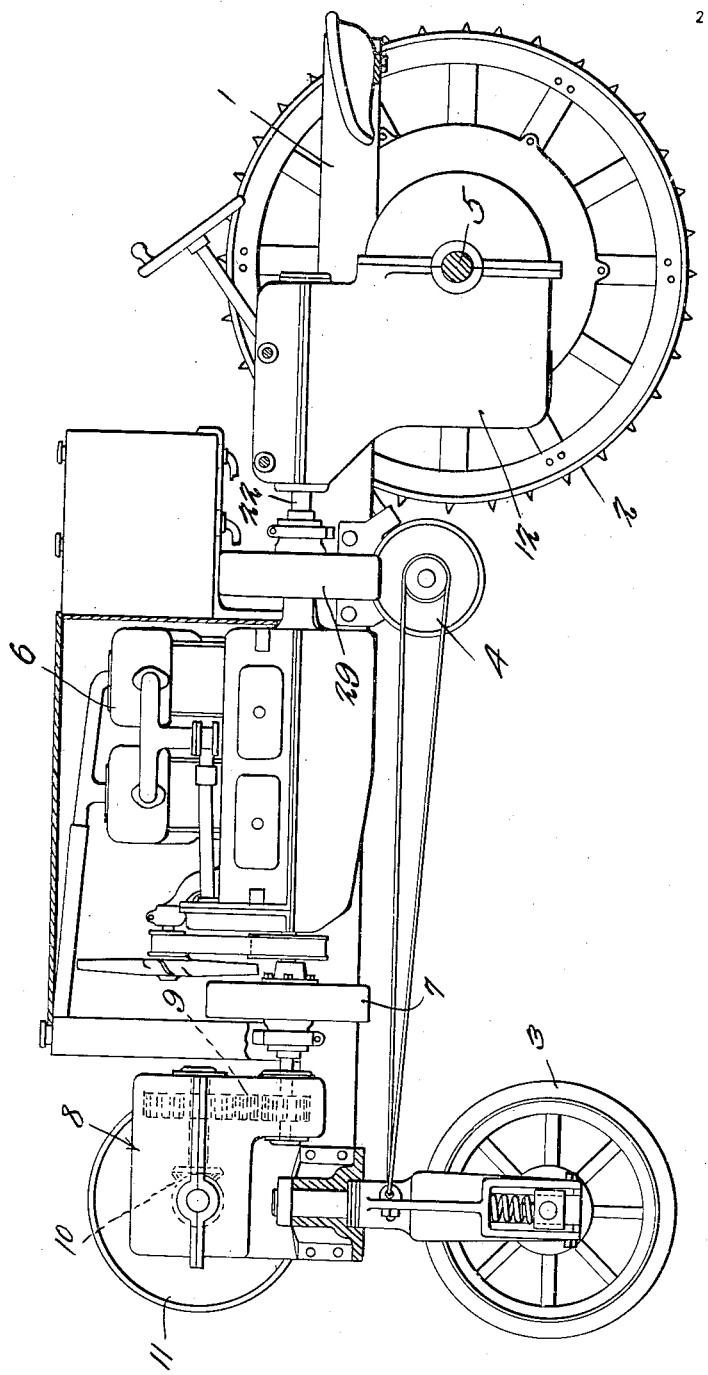
Figure 1 is an elevation of a tractor, constructed in accordance with my invention, there being parts broken away and parts in section.

Referring to the drawing in which like reference characters refer to like parts throughout the several figures, the numeral 1 designates a frame supported at the rear by traction wheels 2, and at the forward end by a single wheel 3, which is adapted to be operated by steering mechanism 4.

The traction wheels 2 are mounted on an axle 5 and a suitable differential (not shown) may be interposed between the traction wheels and axle 5. An engine is mounted intermediate the ends of the frame 2 and is adapted to be coupled, through a clutch 7, to a power delivering mechanism 8, consisting of spur gears 9, bevel gears 10 and a belt pulley 11. The axle 5 extends through a housing 12, which completely incases the speed change gearing 13 and the worm drive 14. The worm drive 14 comprises a roller toothed gear wheel 15 (specifically described in a patent issued to me on July 23, 1918, #1273533) fixed to the axle 5. Meshing with the gear 15 is a worm 16 fixed to a short shaft 17, said shaft being mounted for rotation in roller bearings 18.

The speed change gearing 13 comprises a disk 19 fixedly connected to one end of the shaft 17 and bolted to the disk are bevel gear rings 20 and 21. A shaft 22 mounted in roller bearings 23 is located adjacent the gears 20 and 21 and has mounted for rotation thereon bevel gears 24 and 25, meshing at all times with the gear ring 20 and a gear 26 likewise meshing with the gear 21.

Each of the gears 24, 25, and 26 is provided with a clutch face. Slidably mounted on a squared portion of the shaft 22 is a clutch collar 27, provided at one end with a clutch face adapted to engage the gear 24. A second clutch collar 28 with both ends provided with clutch faces, is also mounted on a square portion of the shaft 22 and is adapted to be brought into engagement with either of the gears 25 or 26.

The shaft 22 is extended at one end through the casing and is coupled to the engine through a friction clutch 29, which may be operated from the driver's seat in the usual manner. In operating at low speed the clutch 27 will engage the gear 24 and drive through the relatively large gear 20 at a low rate of speed, by disengaging the clutch 27 from gear 24, and moving the collar 28 to engage the gear 26 a higher rate of speed may be obtained, or by moving the collar in the opposite direction to engage the gear 25 a reverse motion will be transmitted to the traction wheels. This arrangement of transmission in which the worm shaft is at right angles to the power shaft, makes a compact assembly of the gear set and thereby adds to strength and durability of the tractor.

What is claimed is:

1. In a transmission mechanism for motor vehicles, a driving axle, a gear thereon, a drive shaft, a second shaft at right-angles and intermediate the ends of the first-mentioned shaft, speed change gearing comprising first and second gears fixed on the second shaft, first and second gears loosely mounted on the drive shaft, a clutch slidably mounted on the drive shaft for rotatably connecting the gears to the drive shaft, a casing completely housing the gears and through which the axle extends and a worm operatively connecting the said gearing to the gear on the axle.

2. In a transmission mechanism for motor vehicles, a driving axle, a gear thereon, a drive shaft, a second shaft at right-angles and intermediate the ends of the first-mentioned shaft, speed changing and reverse gearing comprising first and second gears fixed on the second shaft, first and second gears loosely mounted on the drive shaft, a third gear loosely mounted on the drive shaft, a clutch slidably mounted on the drive shaft for rotatably connecting the second and third gears to the drive shaft, a second clutch slidably mounted on the drive shaft for rotably connecting the first gear to the drive shaft, a casing completely housing the gears and through which the axle extends and a worm operatively connecting the said gearing to the gear on the axle.

In testimony that I claim the foregoing as my own, I have hereto affixed my signature in the presence of two witnesses.

WILLIAM Q. PFAHLER.

Witnesses:
NORINE KREITZER,
SHERMAN W. LOTT.